June 15, 1971    W. C. CRYER ET AL    3,584,401
EDUCATIONAL DISPLAY DEVICE AND METHOD
Filed July 1, 1969    11 Sheets-Sheet 1

WILLIAM C. CRYER
LEE V. DIVELY
INVENTOR

ATTORNEY

WILLIAM C. CRYER
LEE V. DIVELY
INVENTOR

ATTORNEY

June 15, 1971 W. C. CRYER ET AL 3,584,401
EDUCATIONAL DISPLAY DEVICE AND METHOD
Filed July 1, 1969 11 Sheets-Sheet 4

WILLIAM C. CRYER
LEE V. DIVELY
INVENTOR

ATTORNEY

June 15, 1971      W. C. CRYER ET AL      3,584,401

EDUCATIONAL DISPLAY DEVICE AND METHOD

Filed July 1, 1969      11 Sheets-Sheet 6

WILLIAM C. CRYER
LEE V. DIVELY
INVENTOR

ATTORNEY

June 15, 1971 W. C. CRYER ET AL 3,584,401

EDUCATIONAL DISPLAY DEVICE AND METHOD

Filed July 1, 1969 11 Sheets-Sheet 7

WILLIAM C. CRYER
LEE V. DIVELY
INVENTOR

ATTORNEY

WILLIAM C. CRYER
LEE V. DIVELY
INVENTOR

ATTORNEY

June 15, 1971   W. C. CRYER ET AL   3,584,401
EDUCATIONAL DISPLAY DEVICE AND METHOD
Filed July 1, 1969   11 Sheets-Sheet 11

LEGEND FOR Fig. 18 THRU Fig. 22

AW = Artwork on transparency

AWV = Artwork on vellum

P = Positive

N = Negative

F = Filter

WILLIAM C. CRYER
LEE V. DIVELY
INVENTOR

ATTORNEY

United States Patent Office 3,584,401
Patented June 15, 1971

3,584,401
EDUCATIONAL DISPLAY DEVICE AND METHOD
William C. Cryer and Lee Vaughn Dively, Tulsa, Okla.,
assignors to Burtek, Inc., Tulsa, Okla.
Filed July 1, 1969, Ser. No. 842,433
Int. Cl. B43l 1/10; G09f 9/34
U.S. Cl. 35—66
37 Claims

ABSTRACT OF THE DISCLOSURE

An educational display device and method of manufacture are disclosed incorporating a normally dark dead front matte surface of photographic film having multiple selected patterns which are reflectively opaque and translucent to a selected backlight and which are normally frontally visually indistinguishable from adjoining dark opaque background areas when viewed under low level reflected room light suitable for reading and writing and at a distance suitable for classroom instructional purposes. The selected pattern areas are disposed in registry with corresponding selectively illuminatable pattern forming cells secured behind a base panel sheet of rigid translucent light diffusing material.

This invention relates to an improved educational or instructional display arrangement, and more particularly to an educational display arrangement which combines the normal appearance and usefulness of a blackboard on which words, diagrams, pictures or other indicia may be removably written or applied as with chalk, or permanently or semipermanently as with paint or ink, while presenting a general dead front non-glare dull surface appearance under reflected room light, but which may be selectively energized to display in translucent glowing form against the dead front surface background various patterns of intelligence or information.

The invention is generally carried out through the manufacture and employment of a rigid panel assembly having a relatively rigid translucent light diffusing base sheet with pattern forming light dams secured along one face, and a sheet of developed high density photosensitive matte surface flexible film along the opposite face, the film having selected pattern areas corresponding with pattern areas formed by the light dams. The developed underexposed flexible film may be permanently or semipermanently secured to the face of the rigid base sheet as by bonding with a transparent or translucent adhesive cement, or, if desired, the flexible film cover display sheet may be mounted on a spring-return self-lock-release roller of the type conventionally employed in window roller shades and thereby enabling multiple use of the same base sheet and light dam assembly with various differently paterned high density developed flexible film front cover sheets and correspondingly different effective light dam patterns.

It is considered desirable in classroom and other instructional situations to provide a panel display device on which various selected patterns or other informational forms may be selectively displayed in lighted and discernible form, but which patterns are not discernible and distracting to the viewers at other times when such are not illuminated. It is also desirable that the viewing surface of the display device be also capable of serving as a blackboard on which pencil, chalk, ink or other writing may be erasably (or, if desired, permanently) made by the instructor, lecturer or other user.

It is a feature of the present invention to provide an educational display device which incorporates a dead front matte surface which may have as little (zero, if desired) normally frontally visible informational or background patterns thereon as desired, while presenting an otherwise dead front surface which may be selectively backlighted to illuminate various patterns formed by reflectively effectively opaque pattern areas which are translucent to transmitted backlight and which are selectively illuminated by backlighting within light-dammed corresponding cell areas behind the front surface.

It is a further feature to provide an educational display device of this dual dead front and illuminated display character in which the dead front display surface is formed by a developed high density photographic flexible film, which may be permanently or removably secured in registry with the light dammed cell areas corresponding to the frontally deflectively opaque but translucent-to-backlight pattern areas to be illuminated on the film.

Still a further feature is the provision of such a multiple display dead front educational device on the dead front display surface on which an instructor or lecturer may easily write and erase, as with chalk or pencil, as on a conventional toothed surfaced opaque and non-distracting dead front blackboard.

Still other objects, features and attendant advantages will become apparent to those skilled in the art from a reading of the following detailed description of several physical embodiments and methods of practice of the invention, taken in conjunction with the accompanying drawings wherein.

Figure 1:
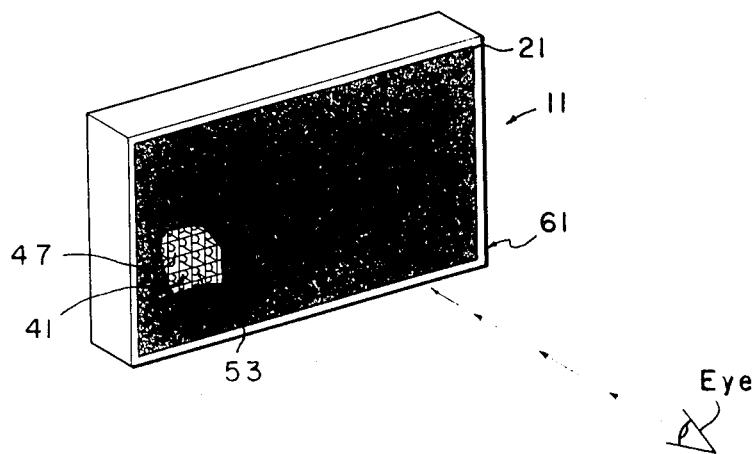
FIG. 1 is a perspective view of a physical embodiment of an educational display device according to the invention, and in normal dead front unlighted condition.
Figure 7:
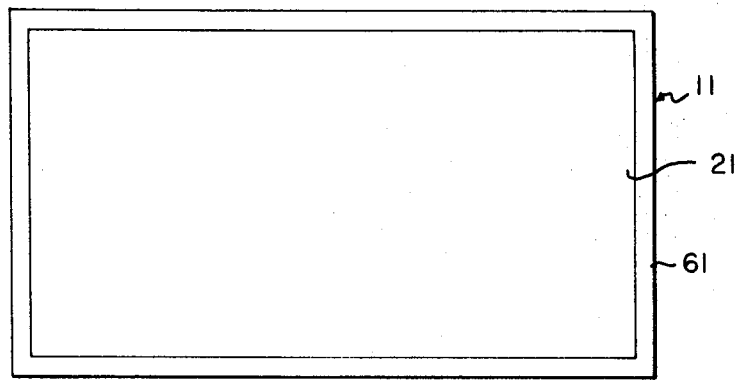

FIG. 7 again illustrates in schematic frontal view the normal non-distracting total dead front surface of the embodiment of FIG. 1, as viewed under normal low level classroom light.

Figure 8:
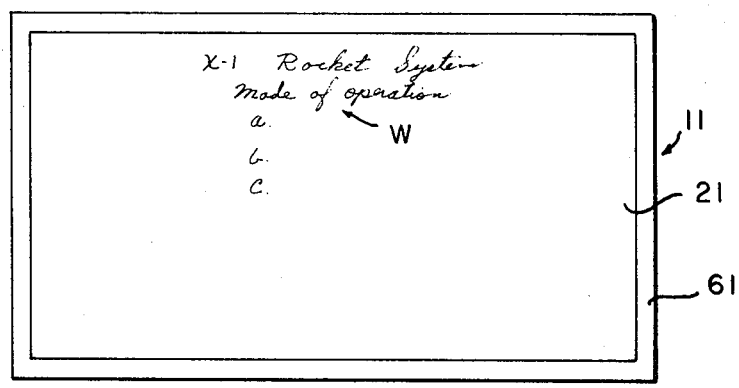

FIG. 8 illustrates the use of the dead front matte display photographic film surface of the device as a blackboard on which information has been erasably written by the instructor.

Figure 9:
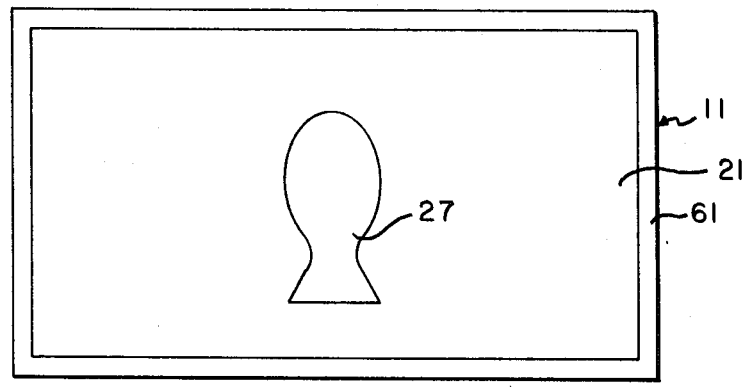

FIG. 9 illustrates the device of FIG. 1, with one of the illuminable pattern areas backlighted and discernible.

Figure 10:
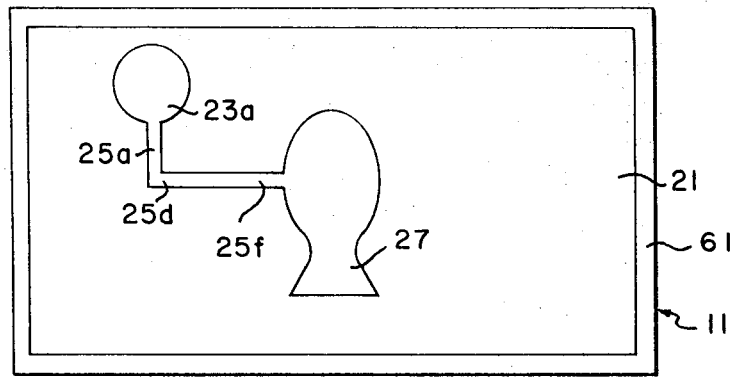
Figure 11:
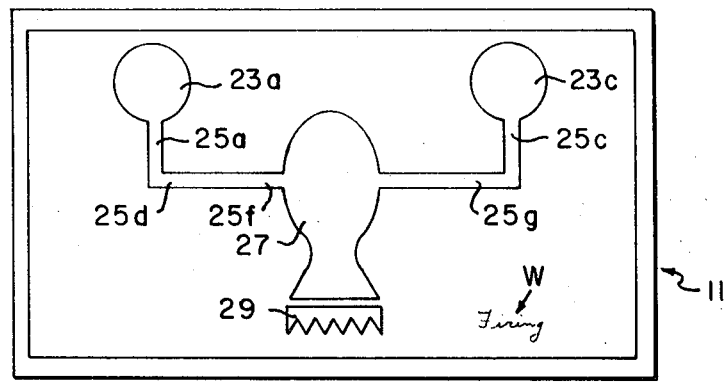

FIGS. 10 and 11 illustrate further backlighted pattern areas.

Figure 12:
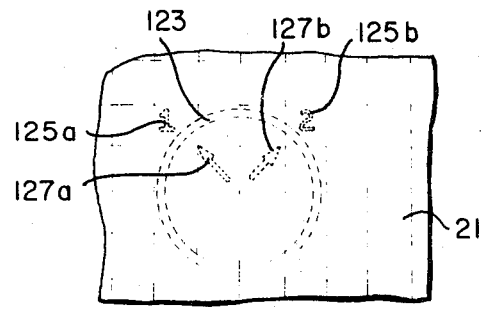

FIG. 12 illustrates an alternative form of variable intelligence patterns which may be selectively backlight displayed according to the invention.

Figure 13:
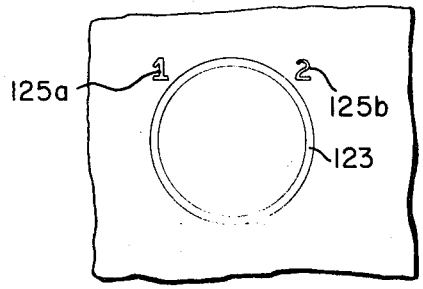
Figure 14:
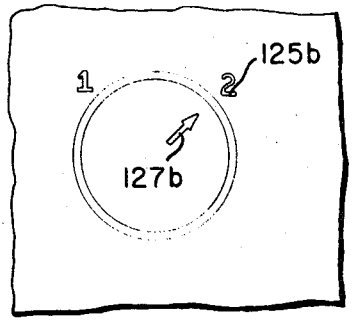

FIGS. 13 and 14 illustrate various modes of display of the patterns of FIG. 12.

Figure 15:
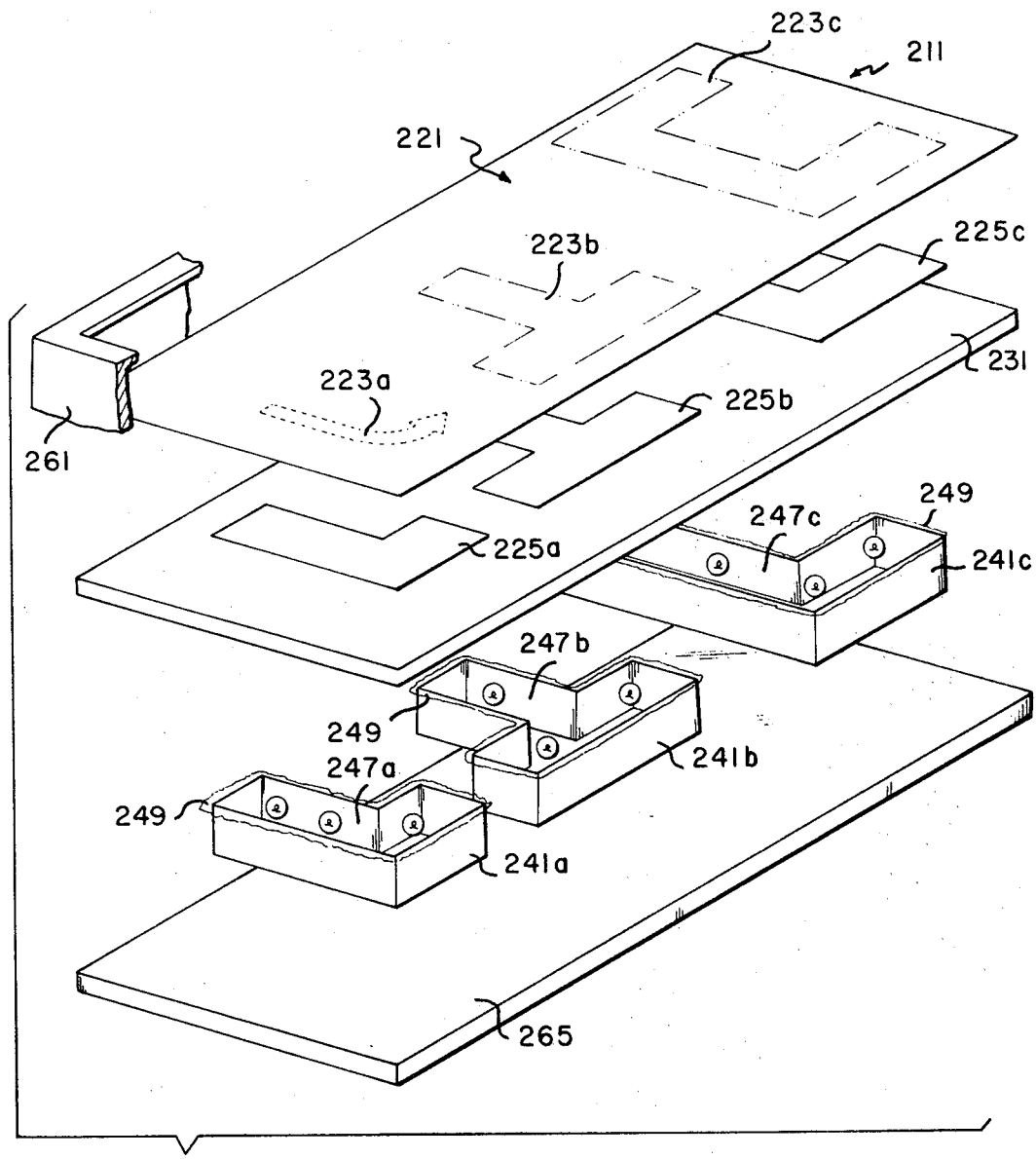

FIG. 15 illustrates an alternative embodiment of the invention.

Figure 16:
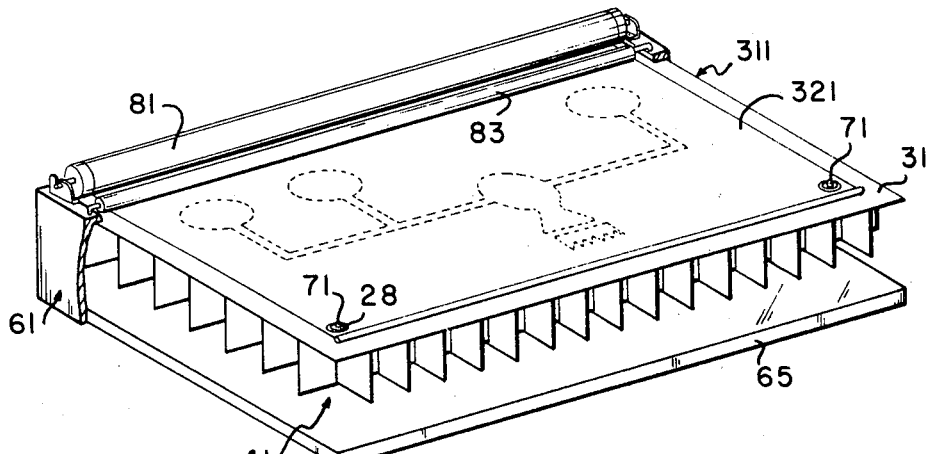

FIG. 16 illustrates a further modified embodiment according to the invention.

Figure 17:
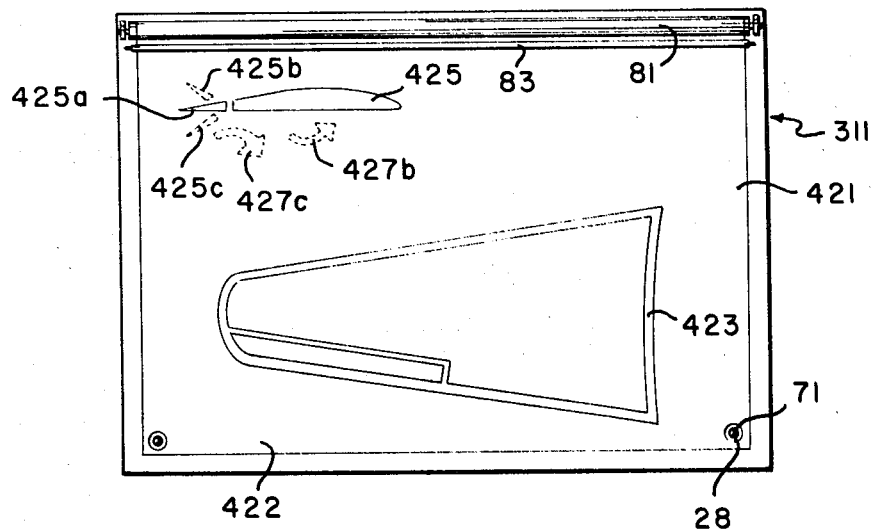

FIG. 17 illustrates the arrangement of FIG. 16 with a different photographic overlay sheet.

Figure 18:
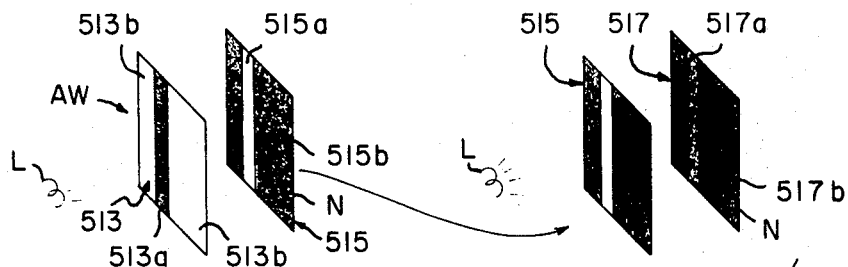

FIG. 18 is a schematic representation of the exposure steps involved making developed high density patterned dead front photographic film according to the invention, and employing an auto-positive projection film.

Figure 19:
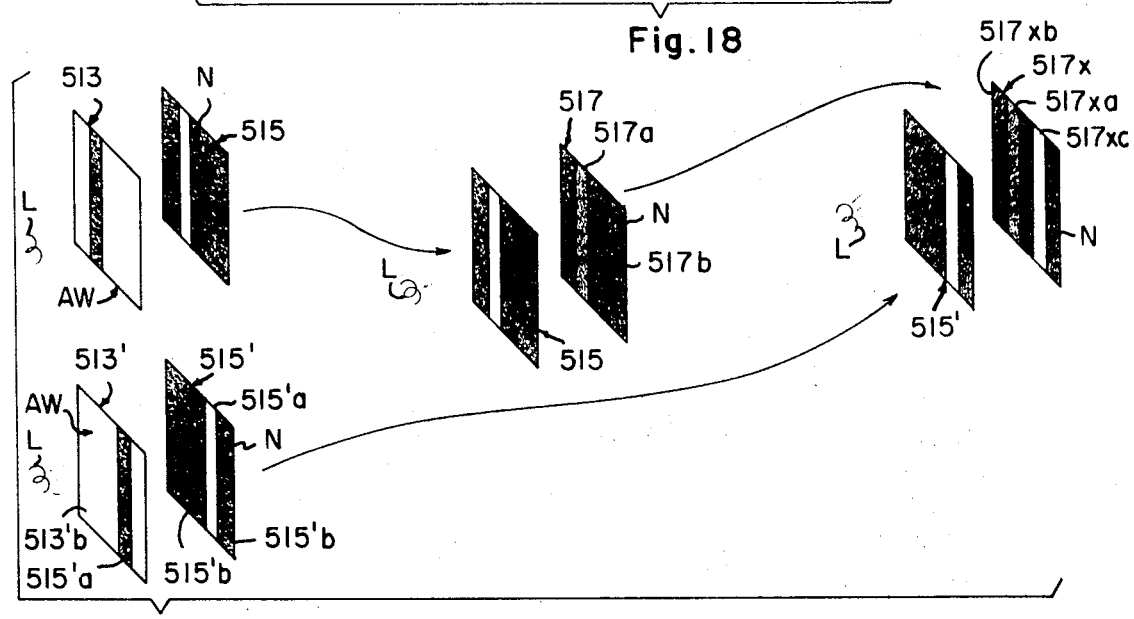

FIG. 19 illustrates the method of FIG. 18, with additional steps for effecting a low density visible pattern area in conjunction with the dead front surface.

Figure 20:
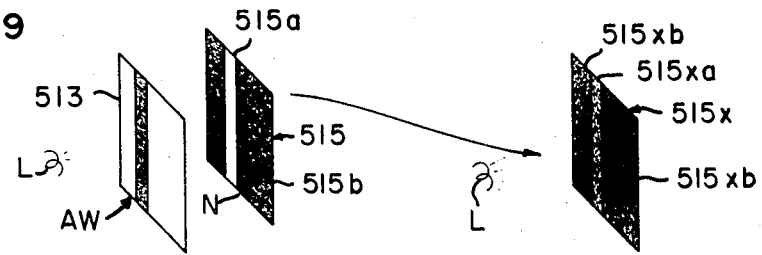

FIG. 20 is a schematic representation of the exposure steps involved in making a developed high density patterned dead front photographic film according to the invention, and employing negative film.

Figure 21:
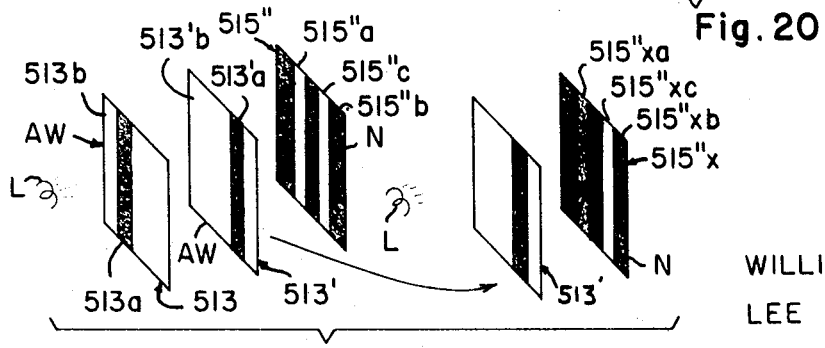

FIG. 21 is a schematic representation of a modified method employing negative film and achieving a further low density visible pattern area in conjunction with the multiple high density level dead front surface.

Figure 22:
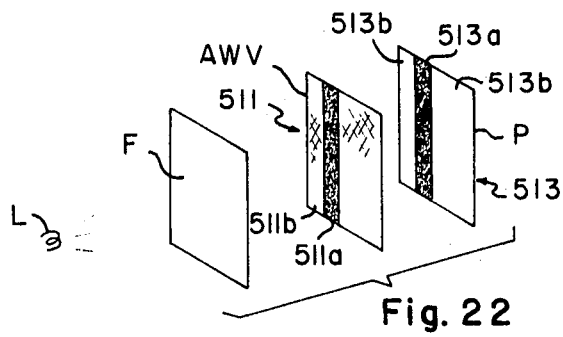

FIG. 22 is a schematic representation of a further step which may be employed for obtaining transparency art work from vellum art work, if vellums are employed, preparatory to practicing the method embodiments of FIGS. 18–21.

Figure 23:
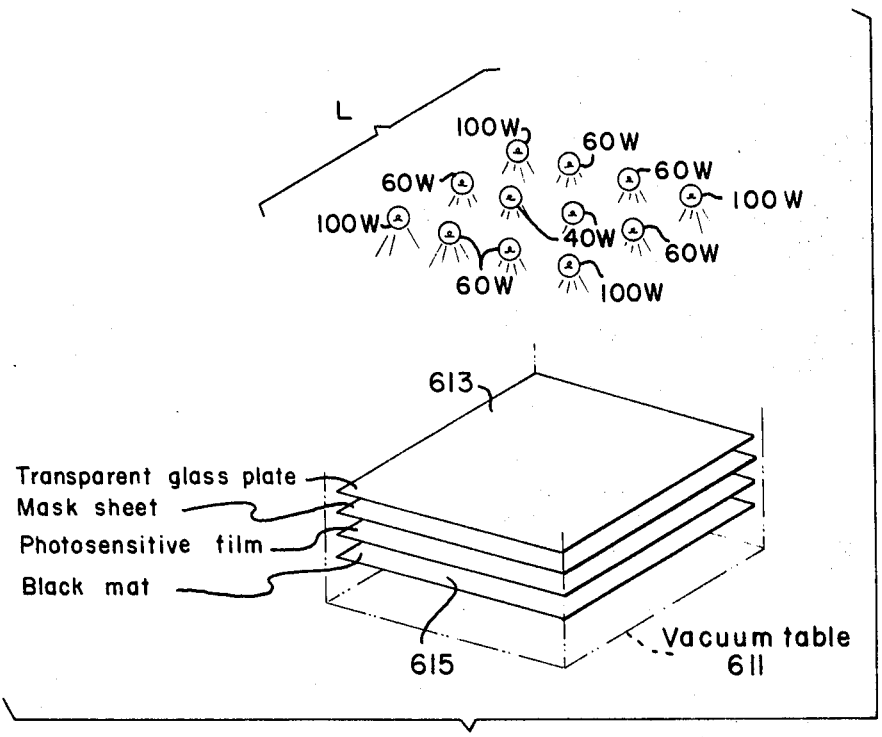

FIG. 23 is a schematic representation of an illustrative lighting exposure arrangement for practicing the methods of FIGS. 16–19, and 20–21.

Referring now in detail to the figures of the drawings, an educational multiple display device 11 is provided as shown generally in FIG. 1, having a normally darkened dead front viewing surface formed by a developed and stabilized high density photosensitive matte surfaced dead front film sheet 21 which is suitably permanently or removably adhered, as with a transparent adhesive of conventional composition for bonding photographic film to a surface without damaging its developed density properties, to the front surface of a rigid panel assembly including a thin, e.g. 1/16 inch, sheet of light transmitting clear plastic, such as preferably a cured clear epoxy resin bonded impregnated glass fiber mat 31, to which a light dam gridwork 41 is secured as by a thin layer 33, e.g. 1/16 inch, of cured clear epoxy resin. The gridwork 41 includes intersecting complementarily oppositely slotted and interleaved strips 43, 45, which form adjoining laterally light dammed cells 47. The rigid panel assembly 31, 33, 41, with its developed and stabilized high density photosensitive matte surfaced dead front film sheet 21 is suitably mounted and housed within a frame or housing 61 having sides 63 with front molding 63a about the periphery of the developed and stabilized high density dead front photosensitive sheet 21 and associated rigid panel assembly 31, 33, 41. Frame 61 may have a back cover 65 of wood or metal to aid in preventing undesired and uncontrolled backlighting.

As used herein, the term "developed and stabilized high density photosensitive film" is employed to mean film which was previously photosensitive and which has been exposed to light or other exposure source to a degree to give it the dark reflectively opaque appearance of conventional positive film when such has been materially underexposed and normally developed, and which has been normally or otherwise developed and suitably stabilized as by conventional stop bath and fixing, to bring out this dark reflectively opaque surface appearance. In this general term, the term "high density" encompasses the range of developed densities or opacities from fully opaque to both transmitted and reflected light on the one hand, to relatively lesser densities or opacities sufficient to enable pattern discernible light transmission from a low level backlight source, yet of a density or opacity such that when the film surface is frontally lighted without backlight the film surface will, at normal classroom or other instructional viewing distances of approximately four to six feet and beyond, appear reflectively opaque and substantially indistinguishable from background fully opaque adjoining areas. In this context, frontal lighting is generally normal indoor low level room reflected light of the level of subdued indirect window daylight which is relatively dim but adequate for instructional classroom reading and writing. This developed high density condition may be generally effected by selected underexposure of auto-positive projection film or by selected overexposure of negative film, combined with suitable developing. The background is considered fully opaque if such does not transmit discernible light from a selected backlight source which is sufficent to effect ready pattern-discernible and effective viewing transmission through the relatively less dense high density pattern areas. For normal classroom instructional purposes in low level room light sufficient for reading and writing, comfortable and effective pattern discernible viewing has been provided with two-watt incandescent bulbs operated at 1.8 watts and spaced approximately one-half to one inch or so behind the viewing surface and each covering a frontal viewing area of approximately two square inches, when employing a translucent clear resin-bonded glass fiber panel sheet 31, 33 having a total light transmission loss of approximately 25 to 50% and a substantial degree of light diffusion. In such instance the matte surfaced developed and stabilized high density photosensitive dead front sheet is satisfactory when such effects a further light transmission loss for the particular backlight source of close to approximately 100% in the opaque background areas desired to remain dark for this degree of backlighting, and in the range of approximately 50–80% light transmission loss in the less opaque high density normally dark dead front pattern areas. The lower level of light transmission loss is generally more effective in very low level amibent room light, while the upper level loss is generally more effective under higher ambient light levels, although such latter higher levels of light transmission loss in the high density pattern areas require a greater degree of backlight illumination and a higher degree of background area opacity of more near approximately 100% light loss to effect good patten definition when backlighted. It will be appreciated that for minimum cost with maximum dead front and pattern illumination effectiveness, a low wattage backlighting is desired, thus indicating a desirable mid-range level of light transmission loss through the normally reflectively dark pattern areas, while employing a relatively high level closely approaching or at approximately 100% light transmission loss in the adjoining background areas which are effectively opaque to both frontal reflective light and the backlight illumination. It will also be appreciated that if too low a level of density is employed in the normally reflectively dark pattern zones these zones will become readily discernible under frontal light and form distracting influences when such are not desired to be shown, and the trade-off gain in backlighting level and cost required will generally be insufficient to overcome this functional deficiency and disadvantage. In such instances of relatively low level light transmission attenuation by the normally reflectively dark pattern areas, it may sometimes be marginally acceptable to employ a relatively less dense, but still reflectively and transmissively dark, background, in conjunction with a lower level backlight illumination for a given effective distance of viewing, thereby providing less contrast between the background and desired pattern areas, and a generally acceptable dark dead front surface area under very subdued ambient area reflective viewing light.

The term "dead front" in the context of this invention applies to photographic film surfaces which are of "high density" as described above and as employed according to the invention, and which employ a light diffusing non-glare matte frontal surface, and preferably a light diffusing matte rear surface.

Figure 5:
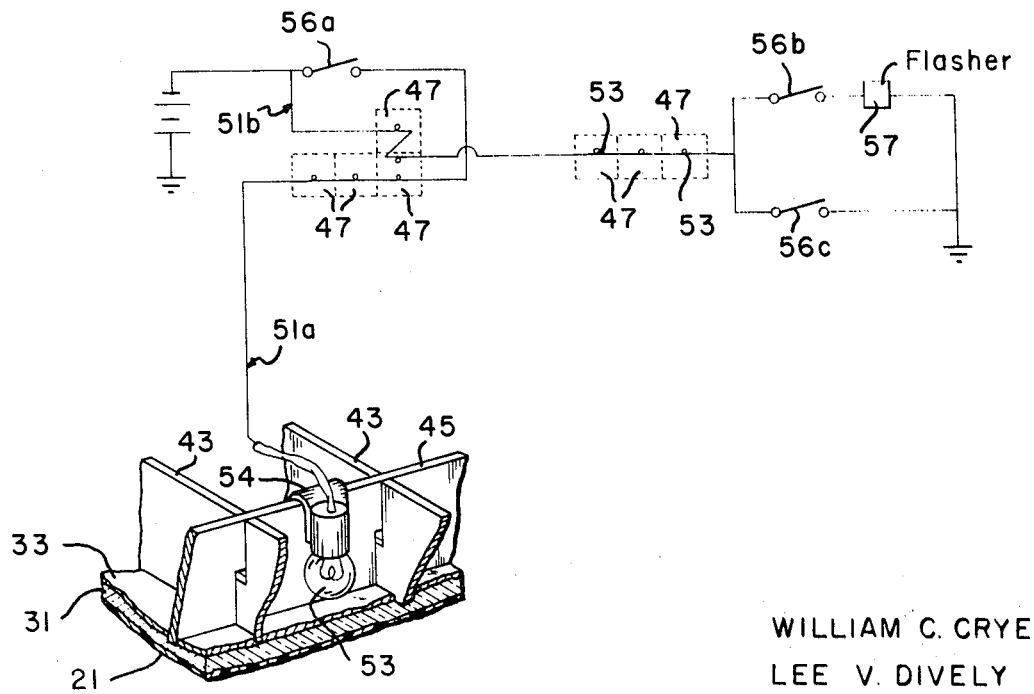
FIG. 5 is a fragmentary view of the panel and cell arrangement of the embodiment of FIGS. 1–4, including a schematic illustration of illustrative lamp illumination circuits for the cells.
Figure 6:
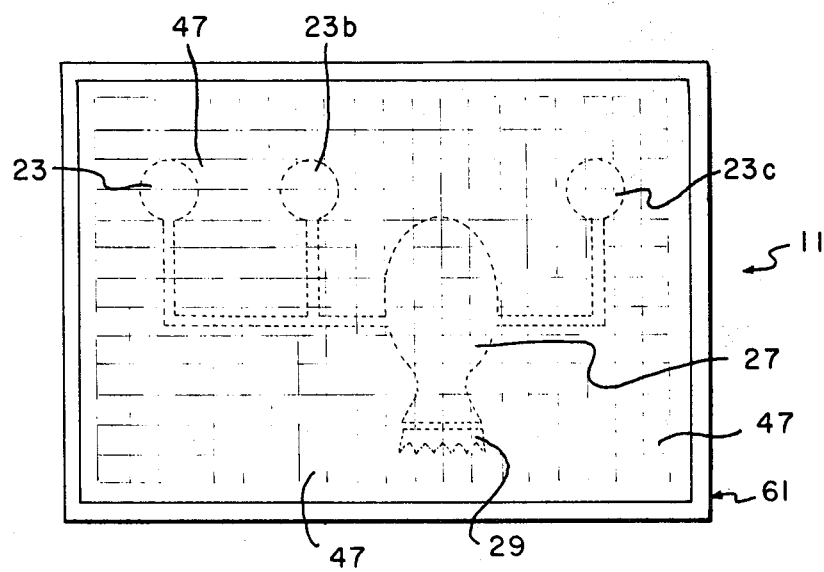
FIG. 6 is a schematic front view of the assembly of FIG. 1, illustrating schematically the intelligence pattern and illuminating cell pattern areas therefor, these pattern areas being normally hidden and substantially indiscernible under instruction level lighting conditions.
Figure 6A:
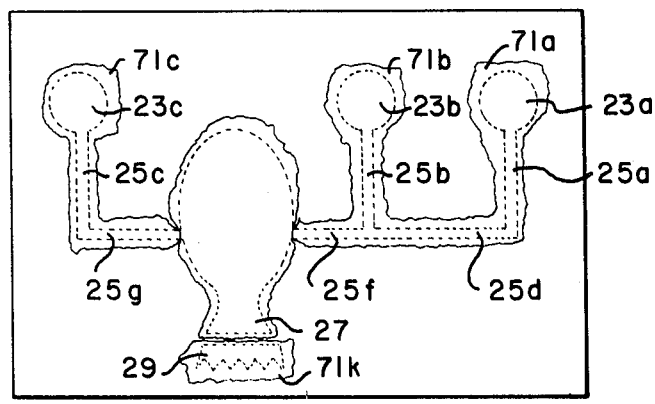
FIG. 6a illustrates the rear surface of the high density matte surfaced photographic sheet of the embodiment of FIG. 1, showing the colored inked pattern areas which are translucent to backlight.

In the illustrated embodiment the entire surface of the developed and stabilized high density photosensitive matte surfaced film sheet is dead front as discussed above, and backlightable pattern areas as discussed above are formed at 23a, 23b, 23c, 25a, 25b, 25c, 25d, 25f, 27 and 29, for selective display of various intelligence information as desired. The lamps 53 may be suitably interconnected in various energizable effective strings 51, (which may series or parallel connected as desired, but are preferably parallel connected, with the grid 41 serving as a common ground), which strings 51 of lamps 53 are disposed as by ground (or insulated as applicable) clips 54 (FIG. 5) in selected cells of the grid 41 corresponding to a selected pattern area 23a–c, 25a–g, 27 or 29 desired to be individually frontally illuminated by backlighting. In this respect, it will be appreciated that in various instances a single cell 47 may have a lamp 53 from more than one pattern string 51 mounted therein as by clip mounting on different strip wall sections of the cell 47, an illustrative example being indicated schematically in illustrative strings 51a and 51b in FIG. 5. The selected pattern strings 51a, 51b, 51c, etc. may be selectively individually or jointly energized as by switches 56a, 56b, 56c, etc. to backlight selected portions, or all, of the individually delineated pattern areas 23a–c, 25a–g, 27 and 29. The surface pattern areas to be individually selectively illuminable are in registry with corresponding cells 47, in each of which there is disposed a lamp 53 interconnected or interconnectable with the other lamps 53 in cells 47 for the individually energizable pattern area. Thus, for example, for pattern area 23a to be individually fully illuminated by backlight, there will be mounted four interconnected or interconnectable and jointly energizable lamps 53 as an effective single string. By use of computer programming control, all lamps may be individually selectively energizable in any selected pattern, in lieu of permanent hardware wiring interconnections. As a further example of pattern lighting the entire schematic rocket motor pattern 27 may be illuminated by backlighting 30 cell pattern areas 47, and the firing exhaust 29 by 4 cell pattern areas 47. In each instance it will be appreciated that the grid cell areas may or may not correspond precisely in shape or size to the backlighted visible pattern areas 23a, etc. on the normally dead front developed and stabilized photosensitive film sheet 21, the effectively transmissively opaque background 22 serving to blank the surrounding area outside the illuminated pattern area. In the instances where two backlightable pattern areas are adjoining and only one is illuminated, the lateral light dams 43, 45 serve to cut off light from one pattern area to the other, aside from a small diffusion bleeding zone which is normally desirable to aid in hiding the light dam strip 43, 45 thicknesses between pattern areas in a single illuminated pattern.

The rear surface of the film sheet 21 is preferably also matte, and enables ready application of transparent or translucent coloring such as tinting ink, to selected pattern areas to be backlighted. By applying the ink on the back side of the film sheet 21, it will be appreciated that the ink can be applied in simple broad brush stroke form without need for strict line conformation except at pattern junctions, as the transmissively opaque background area 22 will blank out frontal viewing of the ink outside the backlight pattern areas. Alternatively, though substantially less desirable, thin transparent or translucent colored plastic sheets or strips may be employed behind selected pattern areas 23a, etc., and between the front film sheet 21 and the rigid translucent panel sheet 31. It is preferable that the developed film emulsion surface of the film form the rear surface of the film sheet 21 in all instances, as this prevents inadvertent and undesirable possible damage to the dead front high density character of the film sheet 21, as during writing or erasing on the front surface as may be done, either alone or in conjunction with backlighted patterns, as indicated at W on FIG. 8 and 11.

FIG. 12 illustrates schematically a form of multiple intelligence pattern array in the form of a dial 123 with numbers 125a, 125b and dial hands 127a, 127b, in which the entire pattern array may be dead front and selectively backlighted as indicated in FIGS. 13 and 14. Or if desired, certain portions of this pattern array, such as the dial outline and numbers, may be permanently illustrated by exposing and developing the desired such pattern area to an extent that such is translucent to reflected light. Such relatively low level permanent pattern front reflected light illumination may then be augmented by backlighting, if desired; however, such permanently visible pattern areas are normally highly distracting unless very carefully chosen, as for illustration of the outline of an object constantly desired to be viewed during instruction, such as a dial face or a major component item such as the rocket motor 27, or perhaps a border outline if such is desired for aesthetic effect. In any event such is only ancillary to the main dead front surface area of the high density developed film sheet 21 with its transmissively effectively substantially opaque normally dark and indescernible backlightable pattern areas.

In FIG. 15 is shown a modified form of the invention as indicated at 211, including a developed and stabilized high density photosensitive matte surfaced dead front film sheet 221, similar in character to film sheet 21, and with selected illustrative backlightable normally dead front pattern areas 223a, 223b, 223c thereon. Transparent colored strips 225a, 225b, and 225c are disposed between the flexible front film sheet 211 and the rigid panel sheet 231, while the laterally dammed backlight cells 247 are formed as units corresponding generally, (though not exactly, as at pattern area 223a), to the film sheet patterns 223a, b, c. Light dam cell walls 241a, 241b, 241c may be secured to the rear face of rigid sheet 231 as by suitable opaque, translucent, or transparent bonding cement or adhesive as indicated generally at 249. A frame 261, 265 may be employed to house the display arrangement as in FIGS. 1–3 et seq. In this arrangement, desired degree of rigidity of the panel assembly may be afforded by the external frame 261, 265 or by other bracing, as the rigidity afforded by the cell gridwork arrangement 41 of FIGS. 1–3 is not afforded by the light dam cell and panel arrangement of this construction.

Figure 2:
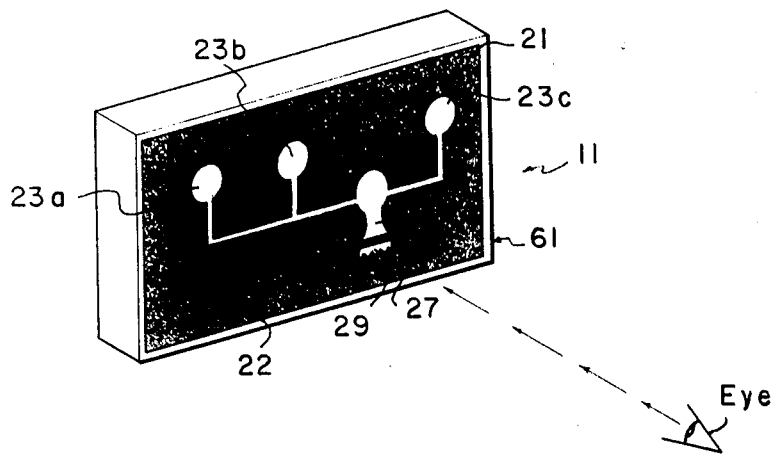
FIG. 2 is a perspective view of the embodiment of FIG. 1 in one selected light pattern condition.
Figure 3:
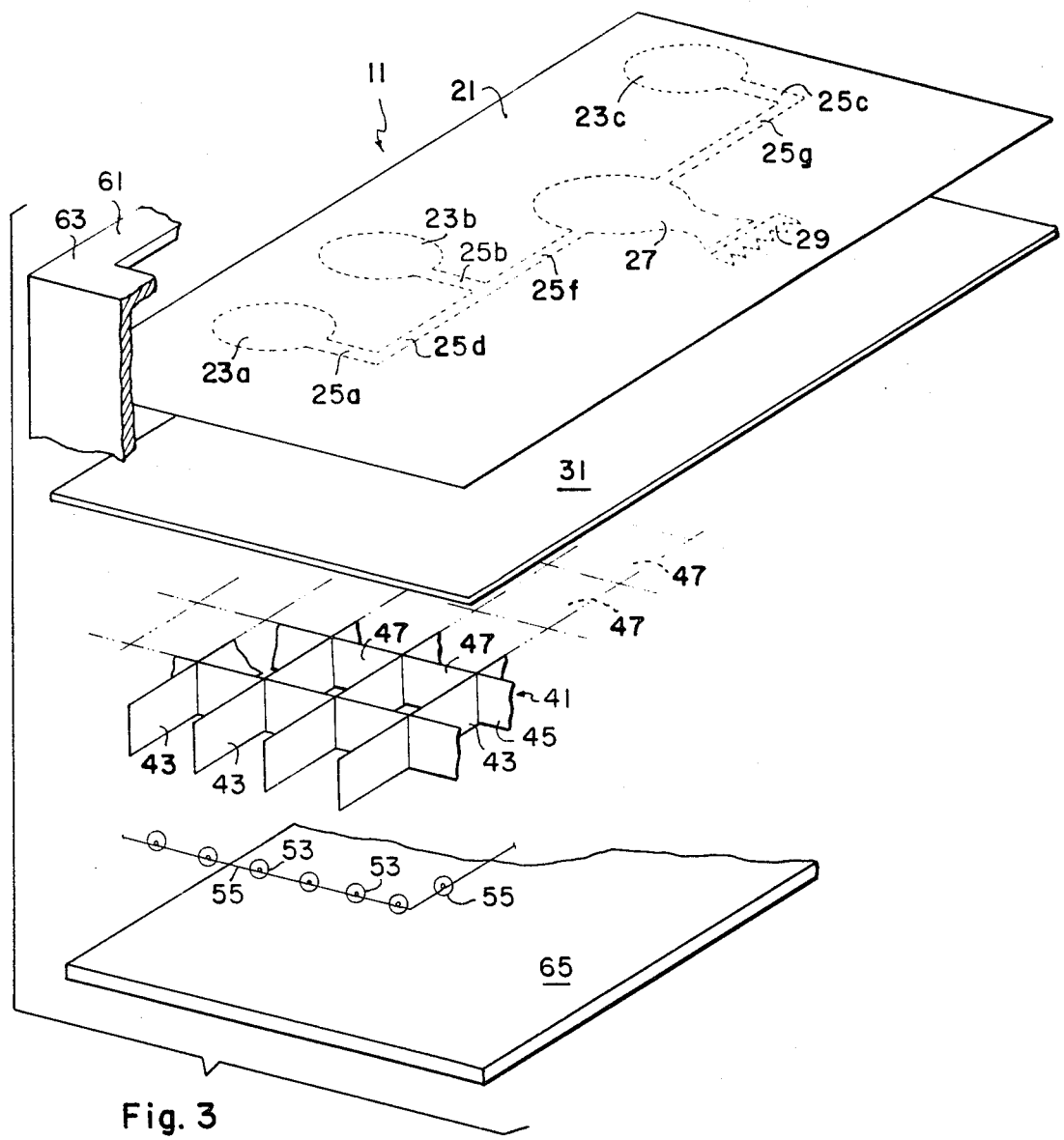
FIG. 3 is an exploded schematic view in perspective of the educational display device of FIG. 1, various parts being broken away for ease and clarity of illustration.
Figure 4:
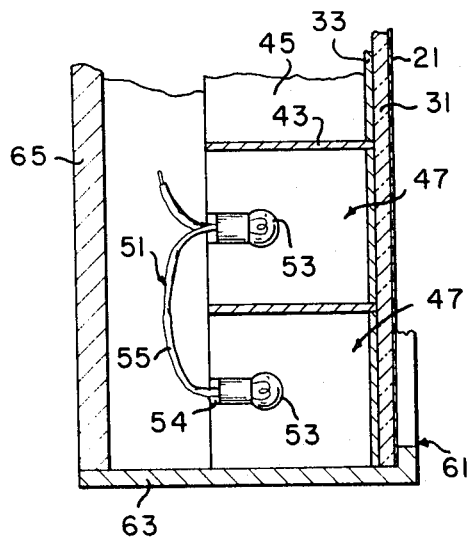
FIG. 4 is a partial section view of the assembly of FIG. 3.

FIG. 16 illustrates a further embodiment 311 of the invention, in which the panel and gridwork backlighted cell arrangement 31, 41 of FIGS. 1–3 et seq. is employed in conjunction with a removable and replaceable high density dead front film sheet 321. The film sheet is mounted on a roller 81, which is preferably a spring-return self-locking-and-releasable roller 81 which may be of a construction such as that employed in conventional roller shades. Suitable registry retention catches, or catch, may be employed to releasably anchor the film sheet with its backlightable pattern areas in desired registry with corresponding backlightable cells of the cell gridwork 41. Such sheet registry retention catches may suitably take the form of headed pins 71 on frame 61 and releasably engaged by grommets 28 in the film sheet 21. A holddown guide roller 83 may be employed if desired to aid in retaining the sheet 21 in close proximity to the rigid panel sheet 31, although for short lengths of film such is not normally necessary as the effective roller diameter does not change materially with film unwinding, in view of the thin (e.g. .003–.006 inch) thickness of the film sheet 21 wound thereon.

It will be apparent that in employing the versatile arrangement of FIG. 16, differently patterned developed dead front film sheets 21 will require different light patterns along the cells 47 of the cell gridwork 41. This may be accomplished by custom rewiring in wiring hardware form in each instance, or if desired all of the individual cells of the cell gridwork 41 may have individually wired lamps connectable in any desired pattern configuration as by plug-in patch panels and/or by computer programming.

In FIG. 17, the embodiment 311 of FIG. 16 is employed with a differently patterned developed and stabilized high density photosensitive matte-surfaced film sheet 421 having a modified dead front on which the schematic outline of a wing in plan view 423 and in cross section 425, 425a is shown in permanent front-light visible form, as discussed in connection with FIGS. 12–14, and the remainder of the surface is dead front including background 422 and backlightable normally non-discernible pattern areas 425b, 425c and 427b, 427c. By suitable interconnections patterns 425b and 427b may be simultaneously selectively backlighted and displayed, as with 425c and 427c, while pattern 425 and/or 423 may be selectively backlighted simultaneously or alone, or not as desired.

In FIGS. 18–22 are shown schematically the exposure steps in various methods of forming the high density dead front patterned photosensitive film sheets according to the invention, a lighting setup suitable for FIGS. 18–21 being shown schematically in FIG. 23.

In FIG. 18 the desired high density dead front photosensitive film sheet is indicated at 517, and such is formed on matte-surfaced auto-positive film by the successive steps as shown from left to right in this figure. Starting with opaque pattern forming artwork on a transparency 513, with a transparent background 513b corresponding to the desired end result transmissively effectively opaque resulting background 517b in the finished film, a conventional negative film is fully or overexposed by a suitable uniform light source L, using the artwork 513 as a contact mask. The artwork 513 of course, may in fact be a developed and stabilized negative or positive photographic sheet from original artwork which may have required some modification or the like to enable its basic use in this method as in this first illustrated step. Such a preliminary step is illustrated in FIG. 22, wherein opaque ink patterned artwork is formed on a vellum sheet, such vellum sheets having a matte type translucent body. The light diffusing translucency and other transmission incongruities of this type material may and usually does result in an unevenly speckled background surface area 515b in the negative 515 which will then adversely affect the desired opacity or density of the background area 517b in the finished film sheet 517. Accordingly, as in FIG. 22, with such artwork on vellum 511 the preliminary step may be carried out of forming effective artwork in the form of an overexposed positive film 513 having a transparent base sheet. As stated, such may be accomplished by using the vellum artwork as a mask for a positive film having a transparent base sheet on which the photosensitive emulsion is disposed, and if desired or necessary for the given film, a yellow or other desired filter F may be employed between the artwork and film and the light source L, which may suitably be an arc lamp, of for instance 1500 watts rating.

Reverting to FIG. 18, the exposed and developed negative 515, with fully opaque background 515b and transparent pattern areas 515a, is next employed as a contact mask for a matte surfaced positive film 517, such as Kodagraph projection positive film, Estar polyester base, EPP4, type SO–221. An exposure period is employed, which for the particular positive film, will yield the desired high density for the pattern areas 517a as discussed previously in respect of frontally reflectively opaque high density pattern areas. The background 517b will be fully opaque, as no exposure is effected on this area due to the full opaque contact masking of this area by the corresponding opaque area 515b of negative 515. It will be noted that the density of this positive film decreases with increasing quantum of exposure, and accordingly the pattern zone 517a may be darkened or rendered more dense by less exposure and less dense by more exposure. An acceptable exposure time, with normal manufacturer recommended development, has been found to be 10 seconds when employing a lighting setup as shown in FIG. 23 (having a four by six foot dispersed lamp array total of 840 watts operated at half rated voltage, i.e. approximately 54 volts) and a distance between the exposure lamp array and photosensitive film 517 of four feet, the photosensitive emulsion side of the film being toward the lamp array. Increases and decreases of density in this region are approximately linear, and for each second of increase or decrease of exposure the light loss is decreased or increased by approximately 10%.

In a specific example according to the immediately foregoing described method of FIG. 18, with the additional preliminary step of FIG. 22, opaquely black inked patterned artwork on vellum is employed as a contact mask for Kodak auto-positive film SP351, type EA4, which has a transparent Estar polyester sheet base and is .005 inch thick. This masked film is exposed, with emulsion side facing the light source, and using a yellow filter overlay sheet F above the artwork sheet, to a 1500 watt arc lamp at four feet, for a period of three minutes, plus or minus one-half minute. A conventional vacuum table may be employed, if desired, to assure direct flat contact. The exposed positive film is then developed in Kodalith Ortho Film Developer (1 part solution A, 1 part solution B, and 6 parts water) after which the film is stopped and fixed with Kodak Stop Bath, SB–1a, and Kodak Rapid Fixer in conventional fashion, then washed, squeegeed on an inclined flat surface and hung to dry. The resulting positive forms the equivalent of the original artwork except that the original translucent vellum background is now transparent.

The resulting transparency background artwork is now employed as in FIG. 18, as a contact mask for conventional negative film such as Kodalith Ortho Type 3 film, .004 Estar base. The exposure for the light setup of FIG. 23, film emulsion side up, and four foot lamp-to-film distance, using a 110 volt, 840 watt total lamp array over a four by six foot area, and operating at 54 volts, is 8 or 9 seconds, plus or minus one second. Uopn standard development and fixing, using conventional recommended chemical baths, the negative 515 is formed.

In the next step of FIG. 18, the negative 515 is employed as a contract mask for exposing Kodagraph projection positive film, Estar base, EPP4, type SO–221, which has an .004 in Estar base which is matte surfaced, i.e. frosted, on both faces, this latter aiding particularly in dead front effect by enhancing reflective light loss in conjunction with the developed density. With the same lighting setup (i.e. as in FIG. 23 with same distance wattage, etc.) as described in the preceding negative-forming step, an exposure time of 10 seconds will yield a satisfactory pattern 517a high density such as to provide approximately 50% light transmission loss with two watt lamps as described in connection with FIGS. 1–3 et seq., and which effectively reflectively substantially opaque pattern density is suitable for approximately two watt backlighting as discussed above and with low level subdued room lighting conditions. Increases and decreases of one second in exposure time, as noted heretofore, will at this level yield decreases and increases of 10% light transmission loss.

This exposed Kodagraph film is then developed, using Kodagraph Ectoflow Type 2 (3 parts to 29 parts water) for 2½ minutes, and is then stopped and fixed with Kodak Rapid Fix, after which it is washed, squeegeed, and dried. This gives the developed and stabilized high density matte surfaced photosensitive film sheet 517 of FIG. 18, and which corresponds to dead front display film sheet 21 and 321 of the various illustrative and previously described embodiments.

In order to form a display film sheet according to the embodiment 421 of FIG. 17, in which a portion of the pattern is constantly frontally visible under reflected front light and also backlightable, the method of FIG. 18 may be modified by the additional steps of forming a second negative mask 515′ from black-on-transparency artwork 513′ as shown in FIG. 19, the second artwork 513′ having black opaque lines at the pattern areas desired to be of frosted front lighted translucency in the final developed film 515′. Then after carrying out the method steps of FIG. 18, and before development, the positive film 517 is further fully or overexposed while using the secondary opaque background negative 515' as a contact mask for this further exposure. As the background 515'b of this mask 515' includes both the desired transmissively opaque background 517xb and the less dense dark dead front patterned area 517xa, only the patterned area 517ac corresponding to artwork opaque pattern 513'a and negative transparent pattern 515'a will be thus fully or overexposed to thereby, upon development, form a frosted translucent pattern 517xc normally readily discernible under front reflected room light, as well as being selectively backlightable similarly to the normally dead front pattern areas 517xa.

FIG. 20 schematically illustrates a further method of forming a dead front film sheet 515x, employing a photosensitive negative film having a matte surface base. According to this modification, artwork 513 as in FIG. 18 is employed as a contact mask for the matte surfaced negative film 515. With this mask in place, the matte surfaced negative film 513 is fully or overexposed to an extent that the desired transmissively opaque high density background 515b will be formed upon development, although a slightly less exposure can be emploed at this step if desired, as this background portion will be further exposed in the next step. In the next step, film 515 is further exposed with the mask 513 removed, the exposure being such, for a given film, as to render the pattern area 515 of a high density (upon development) sufficient to form the desired light diffusing pattern area which is dark and effectively dead front opaque under frontal reflected low level classroom light.

If permanently frontally visible frosted translucent pattern areas are also desired for permanent display, as at 423 in FIG. 17 and at 517xc in the method of FIG. 19, the method of FIG. 21 may be employed. According to this method, an additional mask overlay 513' of opaque artwork on transparency is employed in conjunction with artwork transparency mask 513 of FIG. 20, to carry out the the first exposure step of the method of FIG. 20. In this method modification, the artwork mask 513' having black opaque pattern lines 513'a in the areas where it is desired to form the final translucent frosted normally visible patterns 515"xb, and being transparent in the remaining areas. After carrying out the initial dual mask step, the mask 513 is removed, and the negative 515"x is further exposed (with mask 513' remaining in place) to the same extent as in the second step of the method of FIG. 20, to thereby form the desired developable density of pattern areas 515"xa. The opaquely masked pattern areas 515"xc will thus remain unexposed and will be developed as translucent frosted patterns normally visible under front light, and also being backlightable for emphasis as desired.

FIG. 23 illustrates schematically a suitable exposure setup for carrying out the methods of FIGS. 18–22, and including a conventional vacuum table indicated at 611 for insuring flat contact masking and exposure. In carrying out the exposure steps of these methods, a conventional black mat is preferably used under or behind the photosensitive film sheet, and a transparent glass plate 613 is placed over the stack of mask sheet, photosensitive film and black non-reflective mat 615, and vacuum is applied to pull the glass plate and the remaining stack down against a flat backing plate, not shown, which forms a part of the vacuum table 611.

The light exposure source is formed by an array of incandescent lamps, dispersed as illustrated, to form a generally evenly distributed illumination of the photosensitive film sheet. As mentioned above, the wattages illustrated have been found satisfactorily for a four by six foot array and similar photosensitive film sizes at an exposure distance of four feet.

While the invention has been illustrated and described with respect to various illustrative embodiments, it will be apparent to those skilled in the art that various modifications and improvements may be made without departing from the scope and spirit of the invention. For instance, while specific examples of dead front developed photosensitive film sheets have been described with respect to photosensitive black and white film, the invention may also be practiced with photosensitive color film. Accordingly it is to be understood that the invention is not to be limited by the illustrative embodiments, but only by the scope of the appended claims.

That which is claimed is:

1. An educational display device comprising
   a rigid panel assembly including a rigid lighttransmitting base sheet with a plurality of pattern-forming lateral light dams and associated light sources along one face of said base sheet, and
   a sheet of developed and stabilized high density photosensitive matte-surfaced film disposed along the opposite face of said base sheet, and having certain pattern areas thereon which are generally opaque to reflected light but materially less opaque to transmitted back light than other adjacent areas thereof, which other adjacent areas are also generally effectively opaque to reflected light thereon and are effectively opaque to transmitted back light of an intensity sufficient to be visually detected in pattern delineated form at the front surface of said high density photosensitive matte-surfaced film, and
   said certain pattern areas being in registry with certain of the patterns formed by said pattern-forming lateral light dams and associated light sources.

2. An educational display device according to claim 1, said sheet of developed and stabilized high density photosensitive film being secured to said opposite face of said base sheet with said matte surface forming the frontal surface of the total assembly.

3. An educational display device according to claim 1, and
   a spring-return roller mounted at the front of said base sheet and having said flexible film sheet wound thereon.

4. An educational display device according to claim 1, and
   said sheet of developed and stabilized high density photosensitive matte-surfaced film having a further pattern area which is of relatively low density and normally non-opaque and visible as a delineated frosted light-hued pattern with light diffusing character under reflected front light, and being also visible under backlighting as a delineated bright, frosted pattern with light diffusing character.

5. An educational display device according to claim 4, said further low density pattern area, which is normally non-opaque and visible to reflected front light, being in registry with a further selected pattern formed by said pattern-forming lateral light dams.

6. An educational display device according to claim 5, said further pattern area forming an illustrative configuration of an object to be illustrated, and
   at least a portion of said first mentioned certain pattern areas forming different operational conditions of said object.

7. An educational display device according to claim 6, said different operational conditions being conditions of a movable element at different movement positions relative to said object configurations.

8. An educational display device according to claim 1, said pattern-forming lateral light dams comprising a gridwork of intersecting strips or rigid opaque material forming a plurality of individually laterally dammed cells, and
   said associated light sources being strings of lamps secured along respective ones of said pattern areas formed by said cells.

9. An educational display device according to claim 1, both of the surfaces of said developed and stabilized high density photosensitive flexible film being matte-surfaced to aid in light diffusion therethrough and to enable ease of light transmitting coloring or density modification of the back developed emulsion surface of said film along desired ones of said pattern areas while also enabling writing or other inscriptions, or density modification as desired, on the front viewing surface thereof.

10. An educational display device according to claim 9, and different ones of said pattern areas having selected light-transmitting colors impressed therealong on the rear matte surface of said film sheet.

11. An educational display device according to claim 1, and at least one light-transmitting coloring layer of material between said base sheet and the front surface of said film sheet, and each said layer being in registry with a selected one or more of said pattern areas.

12. An educational display device according to claim 11, each said coloring layer of material being a flexible sheet of light-transmitting material of a selected transmission color.

13. A display arrangement for displaying selected portions of intelligence and having a changed appearance when viewed with reflected light as compared with the appearance when viewed with transmitted light, said arrangement comprising a blackboard sheet having a normally dark dead front matte surface area which is highly opaque and presents a dark dead non-glare appearance under normal room reflected light rays of a low level sufficient for reading and writing illumination, and having certain pattern areas within said normally dark dead front area which are translucent to transmitted light and which present a diffused transmitted light pattern when lighted from the rear by a selected intensity of illumination and other adjoining areas thereon with said dark dead front area which are substantially opaque to transmitted light from the rear and of said selected intensity of illumination, lateral light dams disposed on the rear of said front surface area and forming laterally dammed rear lighted pattern cell areas in registry with selected ones of said certain translucent normally dark pattern areas, and electric lamps disposed along said laterally dammed rear lighted pattern cell areas.

14. A display arrangement according to claim 13, said front matte surface area being formed by a light-diffusing sheet having front and rear matte surfaces, thereby also enabling ease of rear coloring of desired pattern areas with translucent inks and enabling easily erasable informational marking on the front surface.

15. A display arrangement according to claim 14, various ones of said laterally dammed pattern areas having common surface area light-transmitting intersections and lateral light dam sections.

16. A display arrangement according to claim 13, said normally dark dead front matte surface area comprising a developed and stabilized high density photosensitive film sheet having a flexible plastic matte-surfaced film sheet base, said film having two different levels of density at selected areas of its surface, a first one of said levels forming said certain pattern areas and rendering said film substantially frontally opaque to normal room reflective light at a relatively low intensity adequate for reading and writing, but which enables diffused transmission of backlight of a selected intensity to render said patterns discernible when backlighted, and another said level forming said adjoining areas and rendering said film substantially frontally opaque to both said normal room reflective light and to said selected intensity of backlight.

17. A display arrangement according to claim 16, and said film having a third low level of density forming at least one pattern area and which is frontally translucent when front-viewed under said reflected room light.

18. A display arrangement according to claim 17, wherein selected patterns of said first and third levels form a variable common intelligence pattern having a constantly visible third level pattern area and selectively visible alternative first level pattern areas.

19. A display arrangement according to claim 16, wherein said film has a further pattern constantly visible under reflected light on its front surface, and selected pattern of said first level with said further constantly visible pattern forming a variable intelligence pattern having a constantly visible pattern area and selectively visible alternative first level pattern areas.

20. An educational display device according to claim 16, and at least one colored light-transmitting dye or ink on the rear face of said developed film along at least one pattern area.

21. An educational display device according to claim 16, said film sheet being selectively removable, and said rear lighted pattern cell areas and lamps, being changable in pattern, whereby various different pattern-forming film sheets may be positioned over said rear lighted pattern areas as formed.

22. An educational display device according to claim 21, and a spring return roller to which said film sheet is secured for winding thereonto and unwinding therefrom along and for positioned registry with said rear lighted pattern cell areas.

23. An educational display device according to claim 22, and a releasable sheet positioning retainer spaced from said roller for retention and assisting in effecting registry of said developed film sheet pattern areas with the corresponding rear-lighted pattern cell areas.

24. An educational display device comprising a substantially rigid panel sheet of light transmitting and diffusing material, and a developed and stabilized high density photosensitive film sheet in juxtaposition on said rigid panel sheet, lamps disposed in pattern formable formation along selected pattern configurations, said film sheet having a plurality of opacities, the opacities of said film sheet over a major extent of its surface being such as to render said sheet effectively opaquely dead in the zones of said opacities when said panel sheet and developed photosensitive film are front lighted and viewed from the front surface, one of said two major surface opacities being such as to enable backlight from said lamps which is at a level to be effectively blocked by the other of said opacities to be transmitted and distinguishably viewable along selected patterns by a viewer at said front surface, and said one opacity being present along a selected set of said pattern configurations, with said other opacity being present along the zone outside said pattern configurations.

25. An educational display device according to claim 24, said film sheet having a matte front light diffusion and scattering surface on which instructions or other intelligence markings may be removably written with crayon, pencil or other writing instrument.

26. An educational display device according to claim 25, in which all levels of opacity of said film sheet are such as to present a total dead front when said film sheet is front lighted and in the absence of backlight.

27. An educational display device according to claim 24,
said film sheet having a third level of opacity, said third level having lesser opacity to transmitted light than the other two said levels, and forming selected patterns which are visible in translucent form when viewed from the front surface of said film sheet with front lighting and in the absence of backlighting.

28. An educational display device according to claim 24,
said developed and stabilized high density photosensitive film sheet being a matte-surfaced auto-positive film, with said high density being a function of material underexposure to the point of effecting, upon development, plurality of high density opacities under front reflected light and transmitted backlight.

29. An educational display device according to claim 24,
said developed and stabilized high density photosensitive film sheet being a matte-surfaced negative film, with said high density being a function of material overexposure to the point of effectiing, upon development, said plurality of high density opacities under front reflected light and transmitted backlight.

30. The method of making an educational display arrangement comprising:
forming an illuminating panel assembly having a plurality of laterally dammed illuminatable pattern forming cells, and having a relatively rigid light transmission sheet secured thereto,
exposing a photosensitive film to a reflectively opaque high density, through a mask having a plurality of desired patterns thereon corresponding with selected pattern areas formed by said cells,
developing said film to effect said reflectively opaque density within said selected patterns and to effect an effectively transmission opaque density in adjoining background areas, to thereby form a dark dead viewing surface, and
juxtapositioning said film over said panel assembly with said desired patterns in registry with corresponding pattern cell areas on said panel assembly to enable selected illumination of said selected patterns which are normally rendered darkly dead and which blend with the opaque dead background areas.

31. The method according to claim 30,
said exposure being a material underexposure of autopositive developable projection film in said background and selected pattern areas to thereby effect said various opaque densities upon said development.

32. The method according to claim 31,
said exposure being effected by masking the desired background areas while transmitting exposure radiation to said selected pattern areas and to an extent that upon said development said pattern areas will be effectively reflectively opaquely dead and substantially reflectively indistinguishable from the lesser exposed and more opaque adjoining background areas while being distinguishably illuminable by illumination of the corresponding selected said cells.

33. The method according to claim 32, and
effecting a greater quantum exposure of a further selected pattern area to an extent that said further selected pattern area is frontally visible and discernible under reflective front light.

34. The method according to claim 30,
said exposure being a material overexposure of negative developable film in said background and selected pattern areas to thereby effect said various opaque densities upon said development.

35. The method according to claim 34,
said exposure of said film being effected in two illumination exposure steps, one illumination period being with the areas of said selected patterns masked and other adjoining background areas unmasked, and a second illumination period being with said selected pattern area unmasked, the total quantum of illumination on said selected pattern area being less than that on said background areas.

36. The method of claim 35,
in which a further selected pattern area is masked during both of said exposure steps, to thereby render said further selected pattern area frontally visible and discernible under reflective front light.

37. An educational display device comprising
a substantially rigid panel sheet of light transmitting and diffusing material, and
a developed and stabilized high density photosensitive film sheet in juxtaposition on said rigid panel sheet,
said film sheet having a plurality of opacities, the opacities of said film sheet over a major extent of its surface being such as to render said sheet effectively opaquely dead in the zones of said opacities when said panel sheet and developed photosensitive film are front lighted and viewed from the front surface,
one of said two major surface opacities being such as to enable backlight from a light source which is at a level to be effectively blocked by the other of said opacities to be transmitted and distinguishably viewable along selected patterns by a viewer at said front surface, and said one opacity being present along a selected set of said pattern configurations, with said other opacity being present along the zone outside said pattern configurations.

References Cited
UNITED STATES PATENTS

| | | | |
|---|---|---|---|
| 2,360,212 | 10/1944 | Dudley | 35—61 |
| 3,010,235 | 11/1961 | Roberts | 40—132 |
| 3,163,554 | 12/1964 | Gessler | 40—130X |

HARLAND S. SKOGQUIST, Primary Examiner

U.S. Cl. X.R.
35—53; 40—132